US012617262B2

(12) United States Patent
Poggio et al.

(10) Patent No.: US 12,617,262 B2
(45) Date of Patent: May 5, 2026

(54) VEHICLE PROVIDED WITH A POWER STORAGE SYSTEM

(71) Applicant: Ferrari S.P.A., Modena (IT)

(72) Inventors: Luca Poggio, Modena (IT); Elena Ligabue, Modena (IT); Enrico Venturi, Modena (IT)

(73) Assignee: FERRARI S.P.A., Modena (IT)

( * ) Notice: Subject to any disclaimer, the term of this patent is extended or adjusted under 35 U.S.C. 154(b) by 299 days.

(21) Appl. No.: 18/493,840

(22) Filed: Oct. 25, 2023

(65) Prior Publication Data

US 2024/0140187 A1 May 2, 2024

(51) Int. Cl.
| | |
|---|---|
| *B60K 1/04* | (2019.01) |
| *B60L 50/60* | (2019.01) |
| *B60L 50/64* | (2019.01) |
| *H01M 50/211* | (2021.01) |
| *H01M 50/249* | (2021.01) |
| *H01M 50/262* | (2021.01) |

(52) U.S. Cl.
CPC .............. *B60K 1/04* (2013.01); *B60L 50/64* (2019.02); *B60L 50/66* (2019.02); *H01M 50/211* (2021.01); *H01M 50/249* (2021.01); *H01M 50/262* (2021.01); *B60K 2001/0438* (2013.01); *H01M 2220/20* (2013.01)

(58) Field of Classification Search
CPC ............ B60K 1/04; B60K 2001/0438; H01M 50/211; H01M 50/249; H01M 50/271; H01M 50/264; H01M 50/24; H01M 50/262; H01M 2220/20; B60L 50/64; B60L 50/66; F16B 5/0275
See application file for complete search history.

(56) References Cited

U.S. PATENT DOCUMENTS

| | | | |
|---|---|---|---|
| 7,891,927 B2 | 2/2011 | Burger et al. | |
| 2014/0232143 A1* | 8/2014 | Renner ................. | B62D 29/04 |
| | | | 296/193.07 |

(Continued)

FOREIGN PATENT DOCUMENTS

| | | |
|---|---|---|
| EP | 3996177 A1 | 5/2022 |

OTHER PUBLICATIONS

Italian Search Report for Application No. 102022000022350, Filing Date: Oct. 31, 2022; Date of Mailing: May 15, 2023, 6 pages.

*Primary Examiner* — Lori Wu
(74) *Attorney, Agent, or Firm* — CANTOR COLBURN LLP

(57) ABSTRACT

A vehicle having: a frame having a lower wall; and a power storage system having: a container, which is arranged under the frame, is fixed to the lower wall of the frame and is provided with a lower wall; a plurality of battery modules, which are housed inside the container; and a plurality of locking pins, which are fixed to the lower wall of the container, perpendicularly project from the lower wall of the container and engage the battery modules. Each locking pin extends up to the lower wall of the frame and has, at the top, a first hole, which is threaded. The lower wall of the frame has a plurality of second holes, each being a through hole and being aligned with a corresponding first hole. A plurality of mounting screws is provided, each inserted through a second hole of the lower wall of the frame and screwed into the first hole of a corresponding locking pin.

26 Claims, 8 Drawing Sheets

(56)                    References Cited

U.S. PATENT DOCUMENTS

2017/0025655 A1*    1/2017  Klimek ................. H01M 50/24
2018/0114961 A1     4/2018  Kim et al.
2023/0238634 A1*    7/2023  Shin ......................... B60K 1/04
                                                              429/100
2023/0307770 A1*    9/2023  Chang ................. H01M 50/264

* cited by examiner

25

32

29

34

19

33

35

37

VEHICLE PROVIDED WITH A POWER STORAGE SYSTEM

CROSS-REFERENCE TO RELATED APPLICATIONS

This patent application claims priority from Italian patent application no. 102022000022350 filed on Oct. 31, 2022, the entire disclosure of which is incorporated herein by reference.

TECHNICAL FIELD

The invention relates to a vehicle provided with a power storage system.

PRIOR ART

A vehicle can be provided with one single electric motor or with several electric motors (in which case, the drive is a full electric drive) or it can be provided with one or more electric motors combined with a combustion engine (in which case, the drive can be a full electric drive, a combustion drive or a hybrid drive).

The electric motor (or each electric motor) is mechanically connected to the drive wheels and is electrically connected to a power storage system through the interposition of an electronic power converter.

The power storage system consists of two groups of electrochemical cells (usually with a "pouch" structure or with a prismatic structure) connected to one another in series (in order to increase the total electrical voltage). The power storage system can have large dimensions and great weights (especially in case of a full electric drive in which the power storage system can weigh more than 500 kg).

In modern vehicles, the power storage system has a flat and (relatively) thin conformation so that it can be integrated in the floorboard of the vehicle. In this arrangement, the power storage system comprises a container having a lower wall (which constitutes the bottom of the vehicle facing the road surface), an upper wall and a side wall, which is perpendicular to the lower and upper walls and connects the lower and upper walls to one another. Inside the container there are the different groups of electrochemical cells, each forming a corresponding module.

With this arrangement, the power storage system becomes an integral part of the floorboard of the vehicle and, hence, is designed to help provide the floorboard with resistance and stiffness.

Patent application US2018114961A1 discloses a power storage system for a vehicle comprising a plurality of battery modules, which are adjacent to one another and are mounted on a base plate; in order to couple the battery modules to the base plate, each battery module is provided with tubular and hollow connection bodies, into which respective screws are inserted, which are screwed into threaded holes made in the base plate.

Patent application EP21206804A1 discloses a power storage system for a vehicle comprising: a container provided with a lower wall; and a plurality of battery modules, which are housed inside the container and directly rest on the lower wall. Each battery module has a group of electrochemical cells and two containing walls, which are oriented perpendicularly to the lower wall of the container and are arranged parallel to one another on opposite sides of the group of electrochemical cells so as to clamp the group of electrochemical cells between them; each containing wall has at least one tubular connection body and there are a plurality of locking pins, which are fixed to the lower wall, perpendicularly project from the lower wall and engage the connection bodies.

DESCRIPTION OF THE INVENTION

The object of the invention is to provide a vehicle provided with a power storage system, said vehicle having a small weight and, at the same time, being easy and economic to be manufactured.

According to the invention, there is provided a vehicle provided with a power storage system as claimed in the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
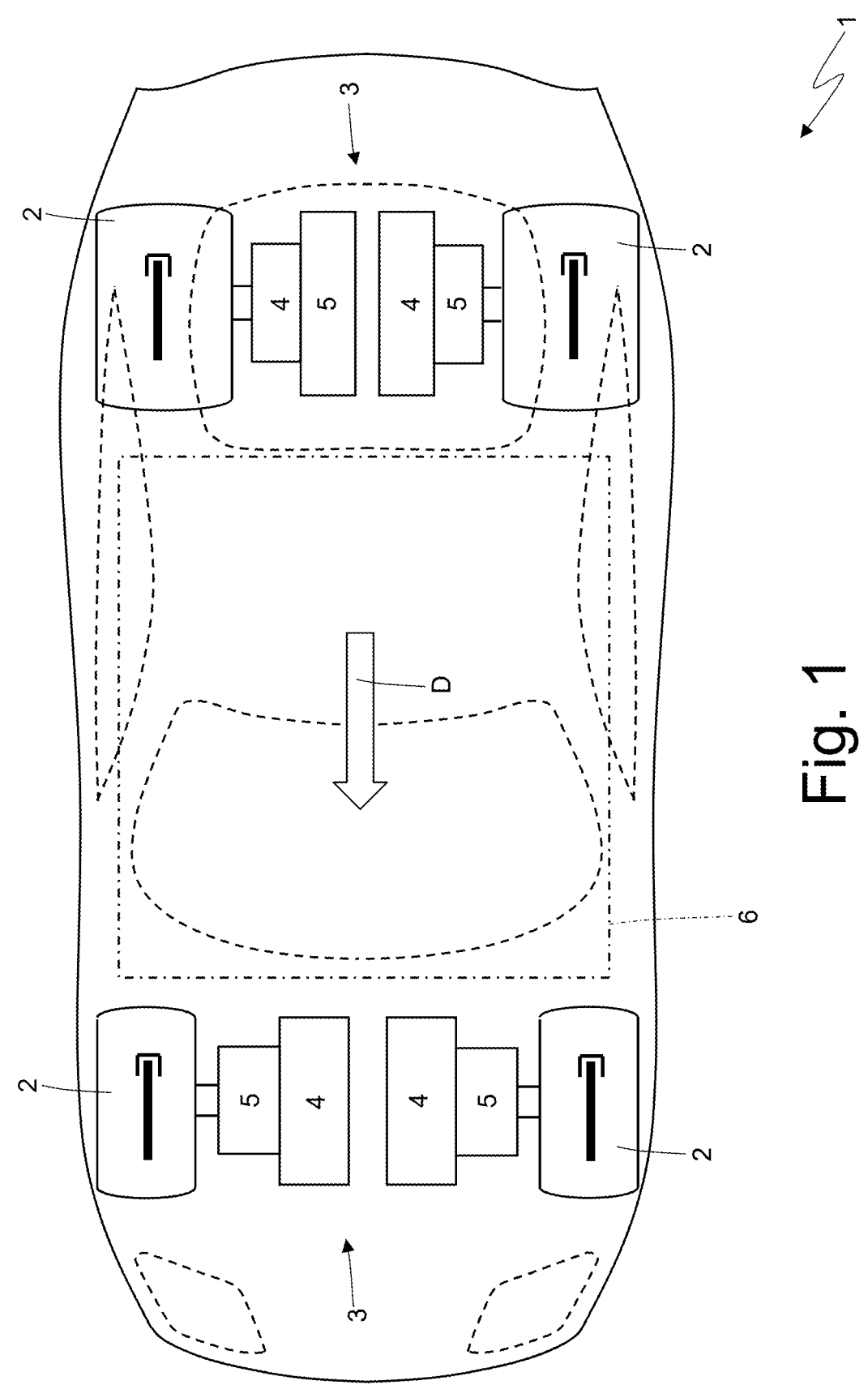
FIG. 1 is a schematic plan view of a road vehicle according to the invention, which is an electric vehicle and is provided with a power storage system.

In FIG. 1, number 1 indicates, as a whole, an electric road vehicle (in particular, an electric car) provided with four drive wheels 2 (two front drive wheels 2 and two rear drive wheels 2).

The road vehicle 1 is obviously designed so that its wheels 2 rest on the road surface and, therefore, it is designed so that it always maintains a given position relative to the vertical. Hence, in the road vehicle 1, namely in all the components of the road vehicle 1, it is possible to identify an upper part (i.e. the vertically highest part) and a lower part (i.e. the vertically lowest part) opposite the upper part.

The vehicle 1 comprises an electric drive system 3, which is arranged in a front position (namely, is connected to the two front drive wheels 2), and an electric drive system 3, which is arranged in a rear position (namely, is connected to the two rear drive wheels 2), is completely identical to the electric drive system 3 arranged in a front position from a structural point of view and is completely independent of and separate from the electric drive system 3 arranged in a front position from a mechanical point of view.

According to a different embodiment which is not shown herein, the vehicle 1 comprises one single electric drive system 3 (arranged in a front position or arranged in a rear position) and, therefore, it only has two drive wheels 2; in this embodiment, the vehicle 1 could also comprise a combustion drive system connected to the drive wheels 2 that do not receive the motion from the electric drive system 3.

Each electric drive system 3 comprises a pair of reversible electric machines 4 (i.e. which can work both as eclectic motor, absorbing electrical energy and generating a mechanical torque, and as electric generator, absorbing mechanical energy and generating electrical energy) provided with respective shafts and a pair of drivetrains 5, which connect the electric machines 4 (namely, the shafts of the electric machines 4) to the corresponding drive wheels 2 without the interposition of a clutch.

Each electric machine 4 is controlled by a corresponding AC/DC electronic power converter (namely, an "inverter"), which is connected to a power storage system 6 provided with chemical batteries; namely, each DC-AC electronic power converter is a two-way converter and comprises a DC side, which is connected to the power storage system 6, and a three-phase AC side, which is connected to the corresponding electric machine 4.

Figure 2:
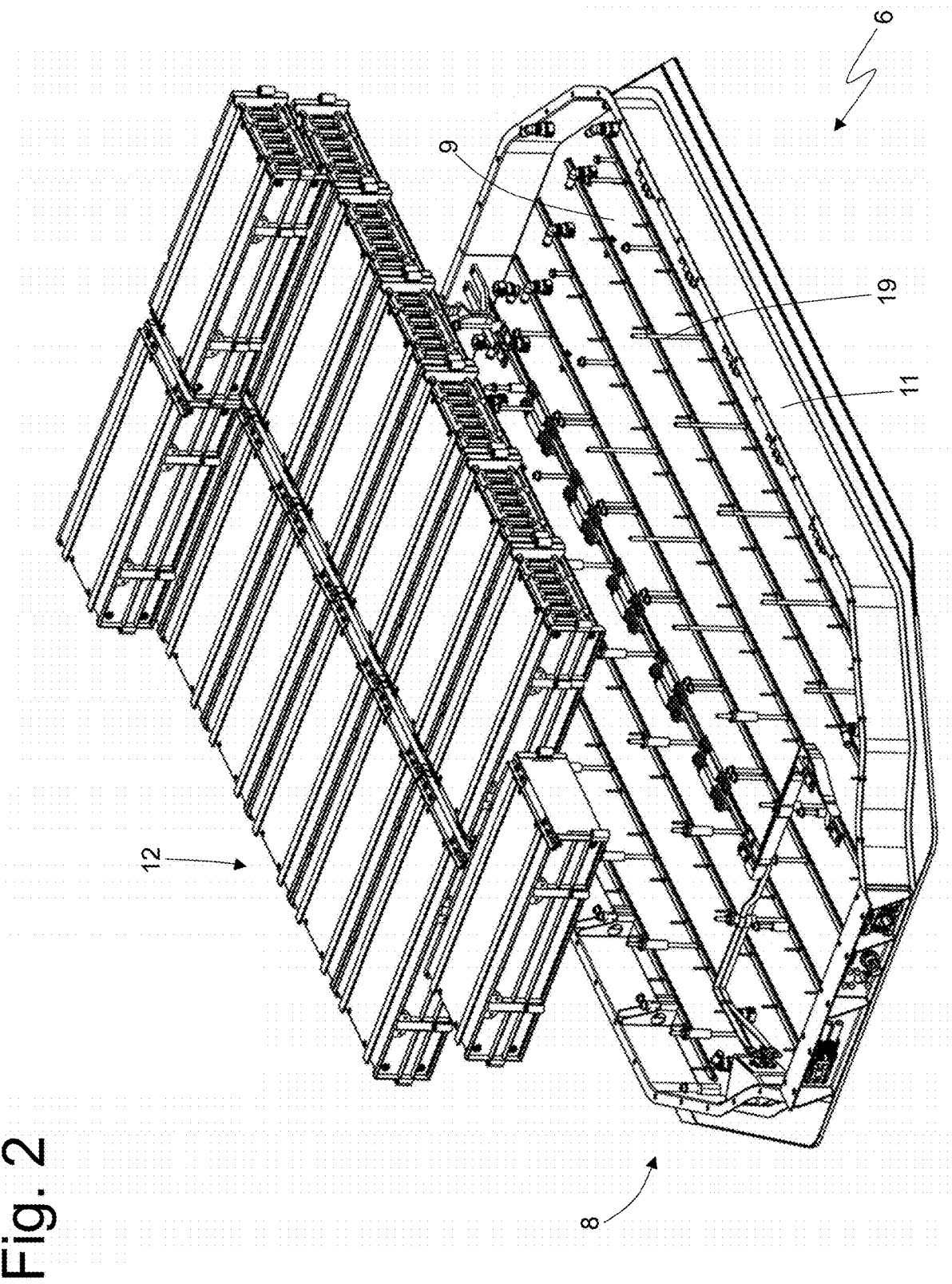
FIG. 2 is an exploded perspective view, with parts removed for greater clarity, of the power storage system of the vehicle of FIG. 1.

As shown in FIG. 2, the power storage system 6 has a flat and (relatively) thin conformation so that it can be integrated in the floorboard of the vehicle 1. In particular, the power storage system 6 is rigidly and firmly connected to a frame 7 (partially shown in FIG. 5) of the vehicle 1 with the connection modes described below.

Figure 5:
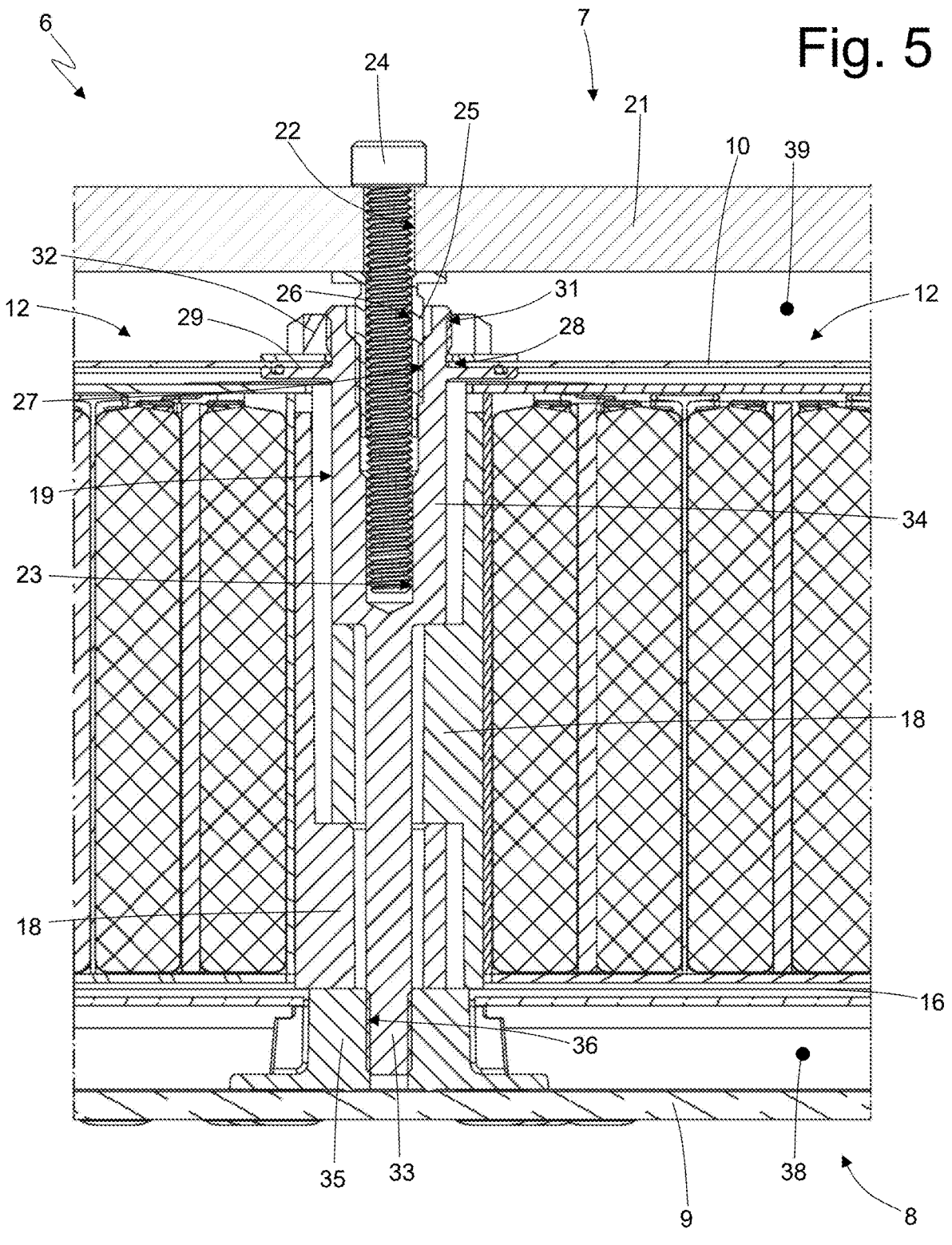
FIG. 5 is a cross section view of the power storage system of FIG. 2.

The power storage system 6 comprises a container 8 having a lower wall 9 (which constitutes the bottom of the vehicle 1 facing the road surface and is oriented horizontally), an upper wall 10 (which is partially shown in FIG. 5, is parallel to the lower wall 9 and is oriented horizontally) and a (vertically oriented) side wall 11, which is perpendicular to the lower and upper walls 9, 10 and connects the lower and upper and lower walls 9, 10 to one another. In other words, the lower wall 9 of the container 8 is arranged vertically lower than the upper wall 10 of the container 8 and, in particular, the lower wall 9 of the container 8 constitutes the vertically lowest part of the container 8, while the upper wall 10 of the container 8 constitutes the vertically highest part of the container 8.

The power storage system 6 comprises a plurality of battery modules 12 (in particular, fifteen battery modules 12), each arranged in the container 8, (at first) separate from and independent of the other battery modules 12 and accommodating, on the inside, a group of electrochemical cells 13 (shown in FIG. 4) with a parallelepiped shape (namely, having a "pouch" structure or a prismatic structure).

Figure 3:
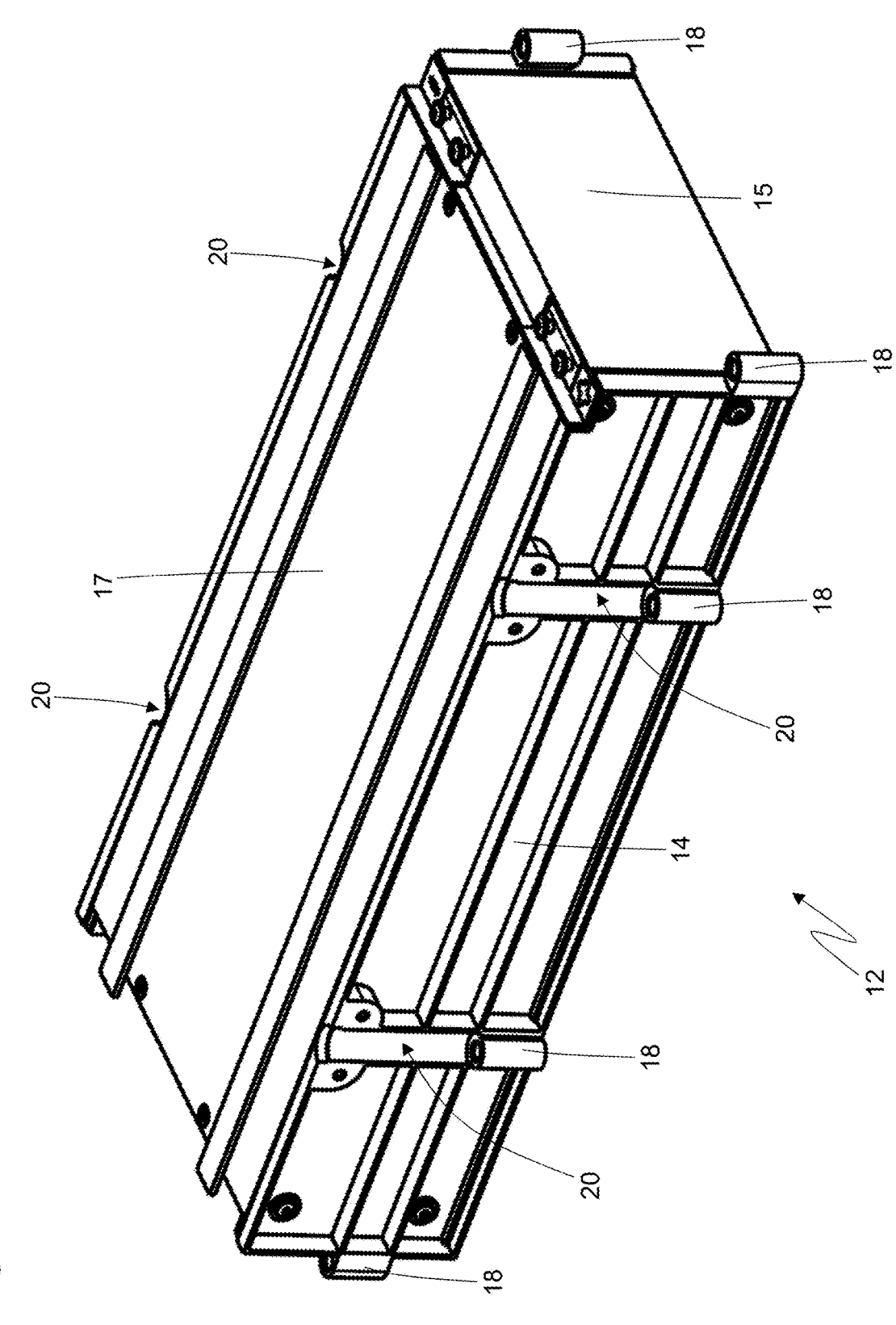
FIG. 3 is a perspective view of the battery module of the power storage system of FIG. 2.
Figure 4:
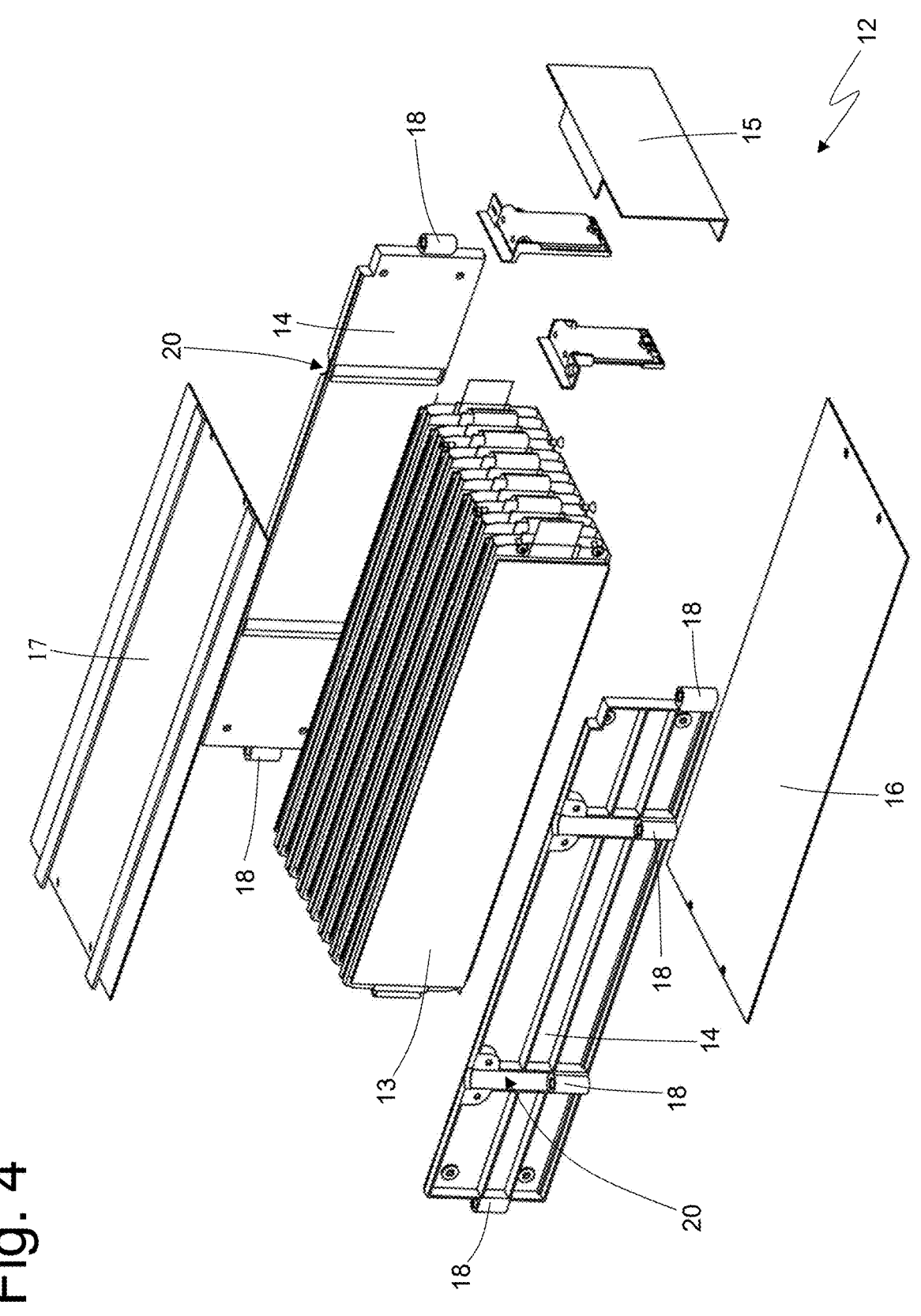
FIG. 4 is an exploded perspective view, with parts removed for greater clarity, of the battery module of FIG. 3.

According to FIGS. 3 and 4, each battery module 12 comprises a group of electrochemical cells 13 with a parallelepiped shape, which is enclosed in a decomposable casing. Each casing comprises two containing walls 14, which are oriented perpendicularly to the lower wall 9 of the container 8 (namely, are oriented vertically) and are arranged parallel to one another on opposite sides of the group of electrochemical cells 13 so as to clamp the group of electrochemical cells 13 between them. Furthermore, each casing comprises two head walls 15, which are arranged perpendicularly both to the two containing walls 14 and to the lower wall 9 of the container 8 (namely, are oriented vertically). Finally, each casing comprises a lower wall 16 and an upper wall 17, which are arranged perpendicularly to the two containing walls 14 and are parallel to the lower wall 9 of the container 8 (namely, are oriented horizontally).

In each casing, the containing walls 14 are the mechanically sturdiest (most resistant) component, namely the containing walls 14 have a mechanical sturdiness (resistance) that is greater than a mechanical sturdiness (resistance) of the head walls 15, of the lower wall 16 and of the upper wall 17. The greater mechanical sturdiness (resistance) of the containing walls 14 is immediately evident from FIG. 4: the walls 15-17 substantially are flat and rather thin metal sheets, while the containing walls 14 have a greater thickness and also stiffening ribs with a significant dimension.

According to a preferred embodiment, each battery module 12 comprises tie rods, which push the two corresponding containing walls 14 towards one another so as to clamp the electrochemical cells 13 between them with a predetermined clamping force (which is necessary for a good operation of the electrochemical cells 13, when dealing with "pouch" electrochemical cells 13).

According to a possible embodiment, the lower wall 16 and/or the upper wall 17 of each casing of a battery module 12 can be coupled to a liquid heat exchanger, which is used to condition (i.e. cool or heat) the group of electrochemical cells 13.

According to a preferred embodiment shown in the accompanying figures, the power storage system 6 is configured to be mounted in the vehicle 1 so that the containing walls 14 of the battery modules 12 are arranged with a transverse orientation relative to a travel direction D of the vehicle 1 (shown in FIG. 1); namely, when the power storage system 6 is mounted in the vehicle 1, all the containing walls 14 of the battery modules 12 have a transverse orientation (i.e. perpendicular to the travel direction D of the vehicle 1).

Each containing wall 14 has a series of tubular connection bodies 18, namely a series of connection bodies 18, each having a central through cavity going through the body 18 from side to side (in other words, the connection bodies 18 are perforated at the centre). In the preferred embodiment shown in the accompanying figures, the connection bodies 18 have a cylindrical shape (hence, their central cavities have a cylindrical shape as well).

According to FIG. 2, the power storage system 6 comprises a plurality of locking pins 19 (having a cylindrical symmetry), which are fixed to the lower wall 9 of the container 8 and perpendicularly project from the lower wall 9 (hence, the locking pins 19 are oriented vertically). The locking pins 19 are configured to engage corresponding connection bodies 18, namely to engage the central cavities (without a significant clearance) of the corresponding connection bodies 18.

According to FIG. 3, each containing wall 14 has several connection bodies 18, which are arranged both in the area of the edges of the containing wall 14 and between the edges of the containing wall 14. According to FIG. 5, two adjacent battery modules 12 have at least two corresponding connection bodies 18, which are aligned with an overlap one another and are both engaged by a same locking pin 19; namely, a same locking pin 19 engages a connection body 18 of a battery module 12 and also a connection body 18 of another adjacent battery module 12. As a consequence, two connection bodies 18 engaged by a same locking pin 19 are arranged in different positions along the locking pin 19, namely they are arranged in a vertically staggered manner (for the locking pins 19 are vertical) so that they can be coaxial to one another.

According to FIG. 3, each containing wall 14 has two recesses 20, which reproduce, in negative, the shape of a connection body 18 and accommodate a connection body 18 of an adjacent contacting wall 14 (as shown in FIG. 5), thus creating an interlocking coupling.

In other words, a first containing wall 14 of a battery module 12 has at least one first connection body 18 (actually, two of them in the embodiment shown herein) and at least one first recess 20, which reproduces, in negative, the shape of a connection body 18 and is coaxial to the first connection body 18, a second containing wall 14 (of another battery module 12), which is adjacent to and rests against the first containing wall 14, has at least one second connection body 18 (actually, two of them in the embodiment shown herein) and at least one second recess 20, which reproduces, in negative, the shape of a connection body 18 and is coaxial to the second connection body 18; when the power storage system 6 is installed, each first connection body 18 of the first containing wall 14 engages a corresponding second recess 20 of the second containing wall 14 and, in the same way, each second connection body 18 of the second containing wall 14 engages the corresponding first recess 20 of the first containing wall 14, thus creating an interlocking coupling (shown in FIG. 5). Obviously, as mentioned above, a first connection body 18 of the first containing wall 14 is arranged so as to be vertically staggered relative to a corresponding second connection body 18 of the second containing wall 14, so that the two connection bodies 18 are coaxial to one another and, hence, can be engaged by a same locking pin 19.

In other words, each containing wall 14 has, for each connection body 18 arranged between the edges of the containing wall 14, a corresponding recess 20, which reproduces, in negative, the shape of a connection body 18 and is coaxial to the connection body 18.

According to FIG. 5, the frame 7 of the vehicle 1 has a lower part 21, which constitutes the lowest part (namely, the closest to the road surface) of the frame 7 and has a plurality of through holes 22. The container 8 of the power storage system 6 is arranged under the frame 7 (at a given distance from the lower wall 21 of the frame 7) and is fixed to the lower wall 21 of the frame 7.

Figures 7, 8:
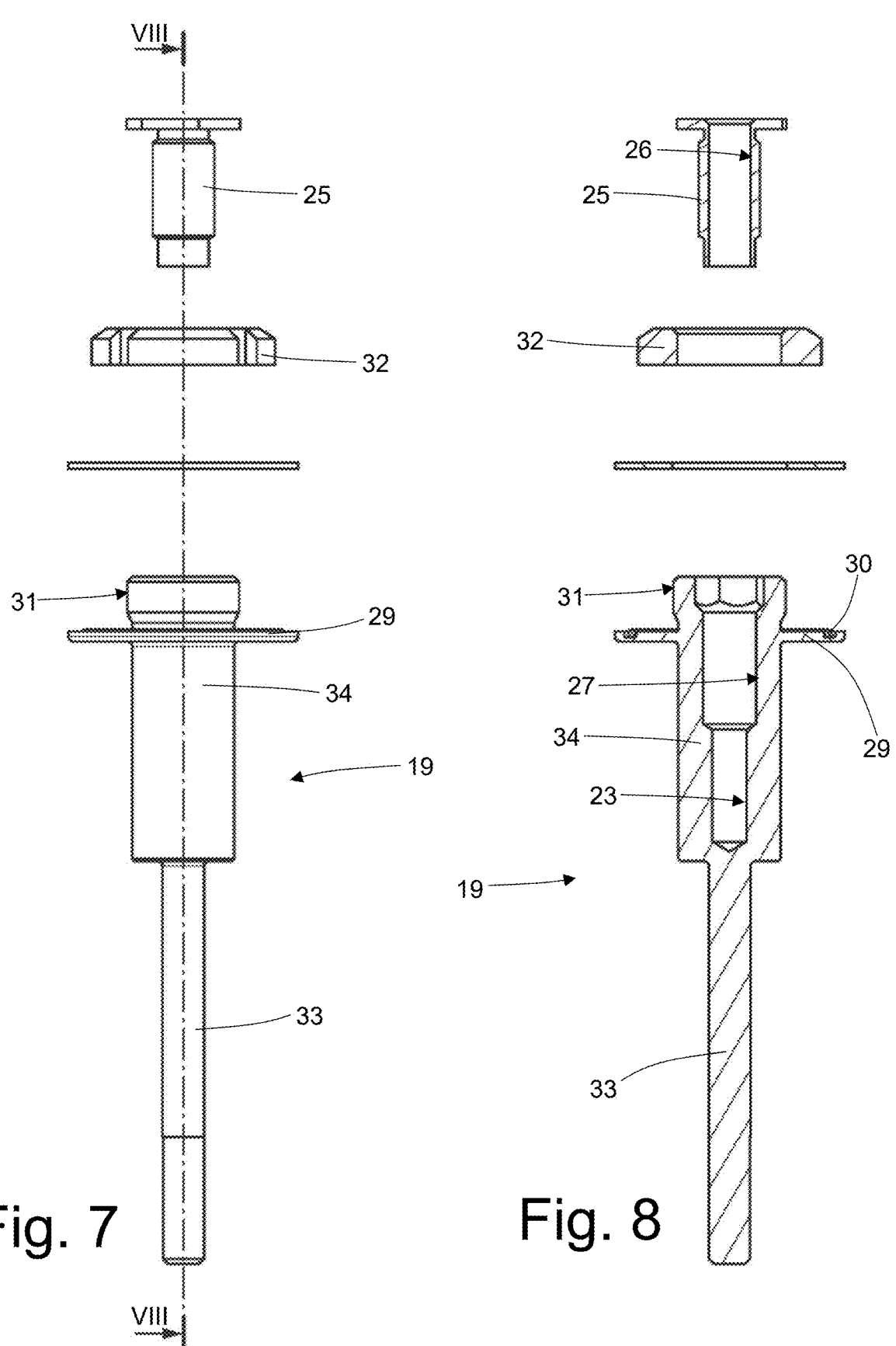
FIG. 7 is a side view of the locking pin of FIG. 6.
FIG. 8 is a longitudinal section view along section line VIII-VIII of the locking pin of FIG. 6.

As mentioned above, the power storage system 6 comprises a plurality of locking pins 19, which are fixed to the lower wall 9 of the container 8, perpendicularly project from the lower wall 9 of the container 8 and engage the battery modules 12. Each locking pin 19 extends up to the lower wall 21 of the frame 7 and has, at the top, a hole 23 (better shown in FIG. 8), which is threaded and dead. As mentioned above, the lower wall 21 of the frame 7 has a plurality of holes 22, each being a through hole and being aligned with a hole 23 of a corresponding locking pin 19. Furthermore, a plurality of mounting screws 24 are provided, each inserted through a hole 22 of the lower wall 21 of the frame 7 and screwed into the hole 23 of a corresponding locking pin 19.

According to a preferred embodiment, a plurality of longitudinal tolerance compensation elements 25 are provided, each interposed between the lower wall 21 of the frame 7 and a corresponding locking pin 19 and crossed by a mounting screw 24. In particular, each compensation element 25 has, at the centre, a hole 26 (better shown in FIG. 8), which is a through hole, is crossed by a mounting screw 24 and is threaded with a left-turning thread (namely, contrary to the thread of the hole 23 of a locking pin 19, which normally is right-turning); when a mounting screw 24 is screwed into the hole 26 of the corresponding compensation element 25, the compensation element 25 is pushed until it strikes against the lower wall 21 of the frame 7 and, once it strikes against the lower wall 21 of the frame 7, weak parts of the compensation element 25 break, thus definitively freezing the position of the compensation element 25. By so doing, the compensation elements 25 make up for all longitudinal tolerances in a different ("customized") manner for each locking pin 19.

The longitudinal tolerance compensation device 25 is of the kind disclosed, for example, in patent application WO2020200776A1 or in U.S. Pat. No. 8,066,465B2, U.S. Pat. No. 7,025,552B2, U.S. Pat. No. 7,891,927B2, U.S. Pat. No. 7,241,097B2 and commercially known with the brand FLEXITOL®.

According to a different embodiment which is not shown herein, there are no compensation elements 25 and the lower wall 21 of the frame 7 directly rests against the upper wall of the locking pins 19.

According to a preferred embodiment, each locking pin 19 has, at the top, a hole 27, which is a threaded through hole, is arranged above the hole 23, has a greater diameter than a diameter of the hole 23 and is engaged by a corresponding compensation element 25, which is crossed, from side to side, by the corresponding mounting screw 24. In other words, each compensation element 25 is screwed into the through hole 27 of a corresponding locking pin 19 and is internally crossed by a mounting screw 24 (which engages the through hole 26 of the compensation element 25), which is screwed into the dead hole 23 of the corresponding locking pin 19. Namely, each compensation element 25 is screwed into the hole 27 of a corresponding locking pin 19 and has, at the centre, the hole 26, which is a threaded through hole and is engaged by the corresponding mounting screw 24, which is screwed into the hole 26.

The upper wall 10 of the container 8 has a plurality of holes 28, each being a through hole and being crossed by a corresponding locking pin 19. Each locking pin 19 preferably has a bracket 29 with a circular shape (namely, a round and flat "collar", which surrounds the locking pin 19), on which the upper wall 10 of the container 8 rests. There preferably are a plurality of annular gaskets 30 (better shown in FIG. 8), each interposed between the upper wall 10 of the container 8 and the bracket 29 of the corresponding locking pin 19 to ensure a hydraulic and pneumatic seal around the corresponding through hole 28 of the upper wall 10 of the container 8. The bracket 29 of each locking pin 19 has a seat, which houses the corresponding annular gasket 30, which, hence, is pre-mounted on the locking pin 19.

Each locking pin 19 has a threaded outer portion 31 (better shown in FIGS. 7 and 8), which is arranged above the bracket 29 and is engaged by a nut 32 (if necessary, also coupled to a bushing shown in the accompanying figures) to press the upper wall 10 of the container 8 against the bracket 29. In other words, each nut 32 is screwed onto the threaded outer portion 31 of the corresponding locking pin 19 and presses (if necessary, with the interposition of a bushing) the upper wall 10 of the container 8 against the bracket 29 of the corresponding locking pin 19.

As mentioned above, two adjacent battery modules 12 have two corresponding connection bodies 18, which are aligned with and overlap one another and are both engaged by a same locking pin 19. As better shown in FIGS. 6, 7 and 8, each locking pin 19 comprises a lower portion 33 with a smaller diameter, which is arranged inside at least one corresponding tubular connection body 18 (as shown in FIG. 5) and ends in the area of the lower wall 9 of the container 8, and an upper portion 34 with a larger diameter, which presses on a corresponding tubular connection body 18 (as shown in FIG. 5) in order to push the corresponding tubular connection body 18 towards the lower wall 9 of the container 8. In other words, each locking pin 19 comprises a lower portion 33, which is arranged inside at least one corresponding tubular connection body 18 and is connected to the lower wall 9 of the container 8, and an upper portion 34, which presses on the tubular connection body 18 in order to push the tubular connection body 18 towards the lower wall 9 of the container 8; the lower portion 33 has a smaller diameter than a diameter of the upper portion 34, so that the lower portion 33 can be inserted into a corresponding tubular connection body 18 and so that the upper portion 34 is too large to be inserted into a corresponding tubular connection body 18 and, hence, presses against the corresponding tubular connection body 18.

Figure 6:
FIG. 6 is a perspective view of a locking pin of the power storage system of FIG. 2.

As better shown in FIG. 6, the container 8 comprises a plurality of support blocks 35, each firmly fixed (for example, through welding or through gluing) to the lower wall 9 of the container 8 and having, at the centre, a hole 36 (shown in FIG. 5), which is threaded and is engaged by a threaded terminal end of a corresponding locking pin 19 (namely, by the lower portion 33 of a corresponding locking pin 19), which is screwed into the hole 36. In other words, the tip (terminal end) of the lower portion 33 of a locking pin 19 is threaded and is screwed into the hole 36 of a corresponding support block 35, which projects from the lower wall 9 of the container 8 and constitutes an extension of the lower wall 9.

According to a preferred embodiment, each support block 35 has a support surface 37 (shown in FIG. 6), on which a corresponding batter module 12 (namely, the lower wall 16 of a corresponding battery module 12) rests, so that the battery module 12 is lifted from the lower wall 9 of the container 8. By so doing, the battery modules 12 are lifted from the lower wall 9 of the container 8 in order to define an empty space (volume) 38 comprised between the lower wall 9 of the container 8 and the battery modules 12.

The empty space 38 between the lower wall 9 of the container 8 and the battery modules 12 mainly has the function of allowing the lower wall 9 of the container 8 to deform upwards (namely, towards the inside of the container 8) without (immediately) coming into contact with the battery modules 12. In other words, the lower wall 9 of the container 8 constitutes a bottom wall of the vehicle 1 directly facing the road surface and, hence, an impact against an obstacle present on the road surface can deform the lower wall 9 of the container 8 inwards; thanks to the presence of the empty space 38, the lower wall 9 of the container 8 has some room to deform inwards without immediately coming into contact with the battery modules 12 and, hence, without immediately stressing the battery modules 12. The empty space 38 between the lower wall 9 of the container 8 and the battery modules 12 could also be used to cool the battery modules 12, namely to house cooling elements for the battery modules 12 or to allow a conditioned fluid (typically, air) to flow through it.

Similarly, between the upper wall 10 of the container 8 and the lower wall 21 of the frame 7 there also is an empty space 39, which allows the battery modules 12 to move upwards due to the thrust of a deformation of the lower wall 9 of the container 8, without immediately coming into contact with the lower wall 21 of the frame 7. The empty space 39 between the lower wall 21 of the frame 7 and the battery modules 12 could also be used to cool the battery modules 12, namely to house cooling elements for the battery modules 12 or to allow a conditioned fluid (typically, air) to flow through it.

In other words, the empty spaces 38 and 39 arranged above and under the container 8 of the power storage system 6 (namely, above and under the battery modules 12) give the container 8 the chance to the vertically deform due to the thrust of an obstacle hitting against the bottom of the vehicle 1, without causing the container 8 to be immediately compressed against the lower wall 21 of the frame 7, thus subjecting the electrochemical cells 13 contained in the battery modules 12 to mechanical stresses that often are (too) high.

Figure 9:
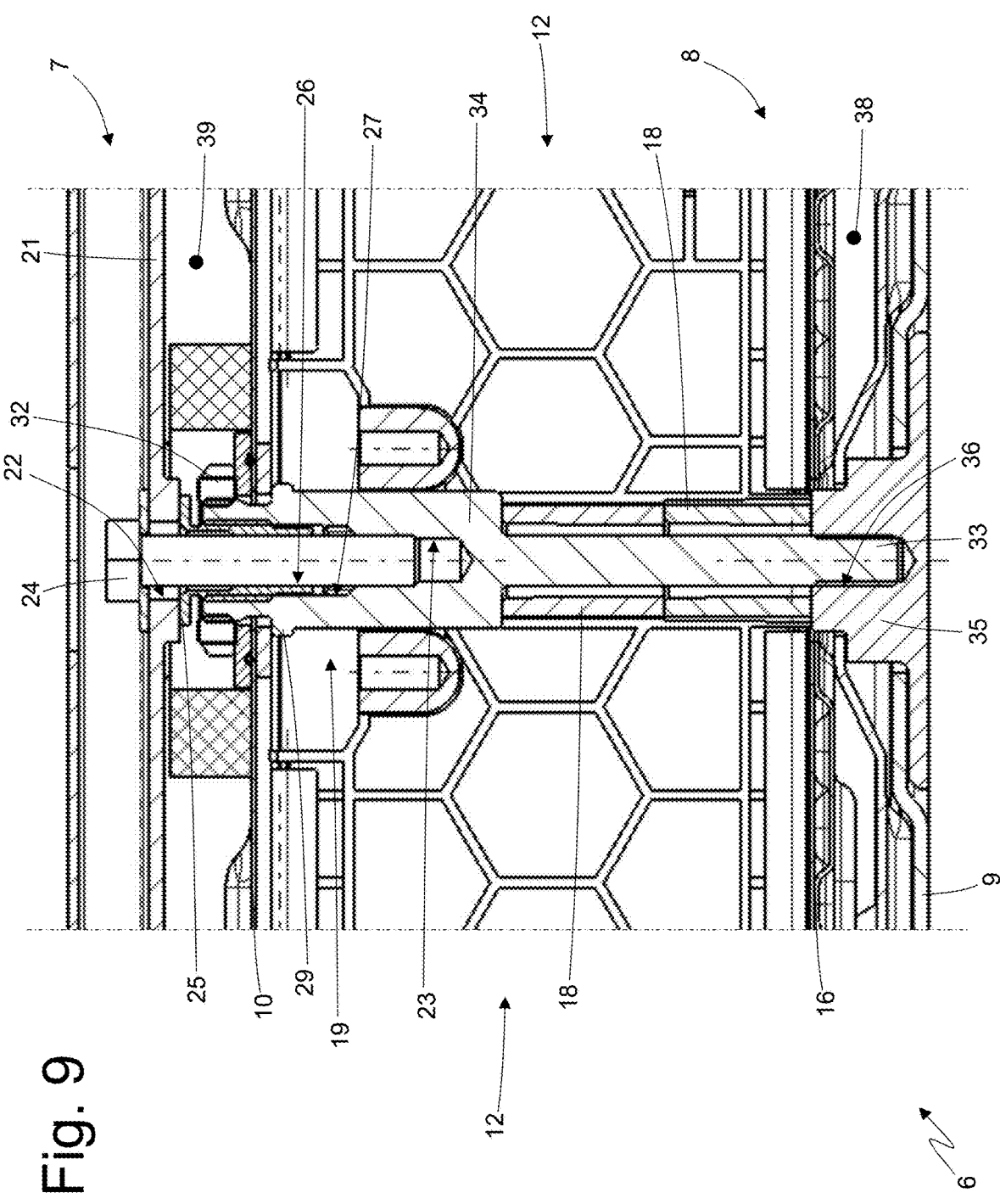
FIG. 9 is a cross section view of a variant of the power storage system of FIG. 2.

The variant shown in FIG. 9 basically differs because of the dimension and the conformation of the bracket 29; in this embodiment, the upper wall 10 of the container 8 is clamped between two bushings, which rest, at the bottom, against the bracket 29 (with smaller dimensions) and, at the top, against the nut 32.

According to a different embodiment, the lower wall 9 of the container 8 does not constitute the bottom wall of the vehicle 1 directly facing the road surface; namely, there is a bottom wall of the vehicle 1, which is different, separate and spaced apart from the lower wall 9 of the container 8.

The embodiments described herein can be combined with one another, without for this reason going beyond the scope of protection of the invention.

The vehicle 1 described above and provided with the power storage system 6 has many advantages.

First of all, the power storage system 6 significantly helps increase the mechanical resistance and the stiffness of the frame 7 of the vehicle 1 and, at the same time, the frame 7 of the vehicle 1 significantly helps increase the mechanical resistance and the stiffness of the power storage system 6. In other words, thanks to the direct connection of the lower wall 9 of the container 8, the containing walls 14 of the battery modules 12 and the lower wall 21 of the frame 7, a "structural synergy" is obtained, which allows both for a particularly stiff frame 7 (since it is reinforced by the presence of the power storage system 6) and for a particularly resistant power storage system 6 (since it is reinforced by the presence of the frame 7), even though, if considered singularly (namely, if considered by themselves and disconnected from the rest), the frame 7 and the power storage system 6 are relatively "weak" and, hence, relatively light. In this way, a significant saving in terms of weight is obtained, both for the frame 7 and for the power storage system 6, without sacrificing in any way the overall structural performances.

Furthermore, the use of multi-purpose locking pins 19 reduces both mounting difficulty and overall weight, since one single element (the locking pin 19) fulfils several functions. As a matter of fact, each locking pin 19 connects the battery modules 12 to the lower wall 9 of the container 8, connects the battery modules 12 to the lower wall 21 of the frame 7, connects the lower wall 9 of the container 8 to the lower wall 21 of the frame 7, supports and locks in the correct position the upper wall 10 of the container 8 and supports the compensation elements 25.

Finally, in the vehicle 1 disclosed above, the power storage system 6 can be removed from the frame 7 in a relatively quick manner in case it needs to be replaced or repaired, since, by removing the mounting screws 24 (and other screws that are not shown herein and are arranged along the periphery of the container 8), the power storage system 6 can be pulled out of the vehicle 1 from the bottom, once the vehicle 1 has been lifted by means of a lift.

LIST OF THE REFERENCE NUMBERS OF THE
FIGURES 1 vehicle
2 wheels 3 drive system
4 electric machine
5 drivetrain
6 power storage system
7 frame
8 container
9 lower wall
10 upper wall
11 side wall
12 battery module
13 electrochemical cells
14 containing walls
15 head walls
16 lower wall
17 upper wall
18 connection bodies
19 locking elements
20 recess
21 lower wall
22 hole
23 hole
24 mounting screws
25 compensation elements
26 hole
27 hole
28 hole
29 bracket
30 annular gaskets
31 outer portion
32 nut
33 lower portion
34 upper portion
35 support block
36 hole
37 support surface
38 empty space
39 empty space
D travel direction

The invention claimed is:

1. A vehicle (1) comprising:

a frame (7) having a lower wall (21), which constitutes the vertically lowest part of the frame (7); and a power storage system (6) comprising: a container (8), which is arranged under the frame (7), is fixed to the lower wall (21) of the frame (7) and is provided with a lower wall (9), which constitutes the vertically lowest part of the container (8); a plurality of battery modules (12), which are housed inside the container (8); and a plurality of locking pins (19), which are fixed to the lower wall (9) of the container (8), perpendicularly project from the lower wall (9) of the container (8) and engage the battery modules (12);

wherein each locking pin (19) extends up to the lower wall (21) of the frame (7) and has, at the top, a first hole (23), which is threaded;

wherein the lower wall (21) of the frame (7) has a plurality of second holes (22), each being a through hole and being aligned with a corresponding first hole (23);

wherein a plurality of mounting screws (24) is provided, each inserted through a second hole (22) of the lower wall (21) of the frame (7) and screwed into the first hole (23) of a corresponding locking pin (19); and wherein a plurality of longitudinal tolerance compensation elements (25) is provided, each interposed between the lower wall (21) of the frame (7) and a locking pin (19) and crossed by a mounting screw (24).

2. The vehicle (1) according to claim 1, wherein each locking pin (19) has, in the area of an upper wall of its, a third hole (27), which is a threaded through hole, is arranged above the first hole (23), has a greater diameter than a diameter of the first hole (23) and is engaged by a compensation element (25), which is crossed, from side to side, by the corresponding mounting screw (24).

3. The vehicle (1) according to claim 2, wherein each compensation element (25) is screwed into the third hole (27) and has, at the centre, a fourth hole (26), which is a threaded through hole and is engaged by the corresponding mounting screw (24), which is screwed into the fourth hole (26).

4. The vehicle (1) according to claim 1, wherein the container (8) comprises an upper wall (10), which constitutes the vertically highest part of the container (8) and has a plurality of fifth holes (28), each being a through a hole and being crossed by a locking pin (19).

5. The vehicle (1) according to claim 4, wherein each locking pin (19) has a bracket (29), on which the upper wall (10) of the container (8) rests.

6. The vehicle (1) according to claim 5, wherein a plurality of annular gaskets (30) is provided, each being interposed between the upper wall (10) of the container (8) and the bracket (29) of the corresponding locking pin (19).

7. The vehicle (1) according to claim 6, wherein the bracket (29) of each locking pin (19) has a seat, which accommodates the corresponding annular gasket (30).

8. The vehicle (1) according to claim 5, wherein:

each locking pin (19) has a threaded outer portion (31), which is arranged above the bracket (29); and a plurality of nuts (32) is provided, each screwed onto the threaded outer portion (31) of the corresponding locking pin (19) and pressing the upper wall (10) of the container (8) against the bracket (29) of the corresponding locking pin (19).

9. The vehicle (1) according to claim 1, wherein a plurality of support blocks (35) are provided, each being firmly fixed to the lower wall (9) of the container (8) and having, at the centre, a sixth hole (36), which is threaded and is engaged by a terminal end of a corresponding locking pin (19), which is screwed into the sixth hole (36).

10. The vehicle (1) according to claim 9, wherein each support block (35) has a support surface (37), on which a corresponding battery module (12) rests so that the battery module (12) is lifted from the lower wall (9) of the container (8).

11. The vehicle (1) according to claim 1, wherein the battery modules (12) are lifted from the lower wall (9) of the container (8) in order to define a first empty space (38) comprised between the lower wall (9) of the container (8) and the battery modules (12).

12. The vehicle (1) according to claim 1, wherein between an upper wall (10) of the container (8) and the lower wall (21) of the frame (7) there is a second empty space (39).

13. The vehicle (1) according to claim 1, wherein the lower wall (9) of the container (8) constitutes a bottom wall of the vehicle (1), which directly faces the road surface.

14. The vehicle (1) according to claim 1, wherein:

each battery module (12) comprises a group of electrochemical cells (13) and two containing walls (14), which are perpendicular to the lower wall (9) of the container (8) and are arranged parallel to one another on opposite sides of the group of electrochemical cells (13) so as to clamp the group of electrochemical cells (13) between them; and each containing wall (14) has at least one tubular con-
nection body (18) engaged by a locking pin (19).

15. The vehicle (1) according to claim 14, wherein at least two adjacent battery modules (12) have two corresponding connection bodies (18), which are aligned with and overlap one another and are both engaged by a same locking pin (19).

16. The vehicle (1) according to claim 15, wherein a same locking pin (19) engages a connection body (18) of a battery module (12) and also a connection body (18) of another adjacent battery module (12) and, as a consequence, two connection bodies (18) engaged by a same locking pin (19) are arranged in different positions along the locking pin (19), namely are vertically staggered so that they can be coaxial to one another.

17. The vehicle (1) according to claim 14, wherein each locking pin (19) comprises a lower portion (33) with a smaller diameter, which is arranged inside at least one corresponding tubular connection body (18), and an upper portion (34) with a larger diameter, which presses on a corresponding tubular connection body (18) in order to push the corresponding tubular connection body (18) towards the lower wall (9) of the container (8).

18. A vehicle (1) comprising:

a frame (7) having a lower wall (21), which constitutes the vertically lowest part of the frame (7); and a power storage system (6) comprising: a container (8), which is arranged under the frame (7), is fixed to the lower wall (21) of the frame (7) and is provided with a lower wall (9), which constitutes the vertically lowest part of the container (8); a plurality of battery modules (12), which are housed inside the container (8); and a plurality of locking pins (19), which are fixed to the lower wall (9) of the container (8), perpendicularly project from the lower wall (9) of the container (8) and engage the battery modules (12);

wherein each locking pin (19) extends up to the lower wall (21) of the frame (7) and has, at the top, a first hole (23), which is threaded; wherein the lower wall (21) of the frame (7) has a plurality of second holes (22), each being a through hole and being aligned with a corresponding first hole (23);

wherein a plurality of mounting screws (24) is provided, each inserted through a second hole (22) of the lower wall (21) of the frame (7) and screwed into the first hole (23) of a corresponding locking pin (19);

wherein the container (8) comprises an upper wall (10), which constitutes the vertically highest part of the container (8) and has a plurality of fifth holes (28), each being a through a hole and being crossed by a locking pin (19).

19. The vehicle (1) according to claim 18, wherein each locking pin (19) has a bracket (29), on which the upper wall (10) of the container (8) rests.

20. The vehicle (1) according to claim 19, wherein a plurality of annular gaskets (30) is provided, each being interposed between the upper wall (10) of the container (8) and the bracket (29) of the corresponding locking pin (19).

21. The vehicle (1) according to claim 20, wherein the bracket (29) of each locking pin (19) has a seat, which accommodates the corresponding annular gasket (30).

22. The vehicle (1) according to claim 19, wherein:

each locking pin (19) has a threaded outer portion (31), which is arranged above the bracket (29); and a plurality of nuts (32) is provided, each screwed onto the threaded outer portion (31) of the corresponding locking pin (19) and pressing the upper wall (10) of the container (8) against the bracket (29) of the corresponding locking pin (19).

23. A vehicle (1) comprising:

a frame (7) having a lower wall (21), which constitutes the vertically lowest part of the frame (7); and a power storage system (6) comprising: a container (8), which is arranged under the frame (7), is fixed to the lower wall (21) of the frame (7) and is provided with a lower wall (9), which constitutes the vertically lowest part of the container (8); a plurality of battery modules (12), which are housed inside the container (8); and a plurality of locking pins (19), which are fixed to the lower wall (9) of the container (8), perpendicularly project from the lower wall (9) of the container (8) and engage the battery modules (12);

wherein each locking pin (19) extends up to the lower wall (21) of the frame (7) and has, at the top, a first hole (23), which is threaded; wherein the lower wall (21) of the frame (7) has a plurality of second holes (22), each being a through hole and being aligned with a corresponding first hole (23);

wherein a plurality of mounting screws (24) is provided, each inserted through a second hole (22) of the lower wall (21) of the frame (7) and screwed into the first hole (23) of a corresponding locking pin (19);

wherein each battery module (12) comprises a group of electrochemical cells (13) and two containing walls (14), which are perpendicular to the lower wall (9) of the container (8) and are arranged parallel to one another on opposite sides of the group of electrochemical cells (13) so as to clamp the group of electrochemical cells (13) between them; and wherein each containing wall (14) has at least one tubular connection body (18) engaged by a locking pin (19).

24. The vehicle (1) according to claim 23, wherein at least two adjacent battery modules (12) have two corresponding connection bodies (18), which are aligned with and overlap one another and are both engaged by a same locking pin (19).

25. The vehicle (1) according to claim 24, wherein a same locking pin (19) engages a connection body (18) of a battery module (12) and also a connection body (18) of another adjacent battery module (12) and, as a consequence, two connection bodies (18) engaged by a same locking pin (19) are arranged in different positions along the locking pin (19), namely are vertically staggered so that they can be coaxial to one another.

26. The vehicle (1) according to claim 23, wherein each locking pin (19) comprises a lower portion (33) with a smaller diameter, which is arranged inside at least one corresponding tubular connection body (18), and an upper portion (34) with a larger diameter, which presses on a corresponding tubular connection body (18) in order to push the corresponding tubular connection body (18) towards the lower wall (9) of the container (8).

\* \* \* \* \*